(12) United States Patent
Kunikata et al.

(10) Patent No.: US 7,072,143 B2
(45) Date of Patent: Jul. 4, 2006

(54) TAPE REEL

(75) Inventors: Masanosuke Kunikata, Kanagawa (JP); Masaki Suzuki, Kanagawa (JP); Hiroaki Takano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 606 days.

(21) Appl. No.: 10/285,523

(22) Filed: Nov. 1, 2002

(65) Prior Publication Data
US 2003/0117747 A1  Jun. 26, 2003

(30) Foreign Application Priority Data
Nov. 1, 2001  (JP) ............... P.2001-336495

(51) Int. Cl.
*G11B 23/02*  (2006.01)

(52) U.S. Cl. ..................................... 360/132

(58) Field of Classification Search ................. 360/132
See application file for complete search history.

(56) References Cited

U.S. PATENT DOCUMENTS 4,555,443 A * 11/1985 Kikugawa et al. .......... 428/336
5,259,563 A * 11/1993 Kakiwaki et al. ........ 242/334.3
6,604,700 B1 * 8/2003 Kiso ........................... 242/345

* cited by examiner

*Primary Examiner*—A. J. Heinz
*Assistant Examiner*—Mark Blouin
(74) *Attorney, Agent, or Firm*—Sughrue Mion, PLLC

(57) ABSTRACT

A normal tape reel is disclosed, comprising a tape reel portion and a magnetic tape wound on the reel core of the tape reel portion, wherein the ratio of the winding radius R of the magnetic tape to the radius r of the reel core (R/r) is not smaller than 3.5 and the winding hardness of the magnetic tape is adjusted to a range of from 1.9 to 11.5 N.

4 Claims, 1 Drawing Sheet

TAPE REEL

FIELD OF THE INVENTION

The present invention relates to a tape reel and a tape cassette comprising the tape reel. More particularly, the present invention relates to prevention of stepping of magnetic tape from the winding wall of magnetic tape and winding looseness of magnetic tape during transportation or the like.

BACKGROUND OF THE INVENTION

The art of magnetic recording has sawn the progress of enhancement of performance such as switching to digital form, reduction of size and prolongation of performance time. In general, the recent trend of magnetic recording media allowing the use of a magnetic tape such as audio tape and video tape housed wound on a reel in a cassette is the reduction of diameter of reel core with the reduction of size of cassette. On the other hand, the trend of tape itself is greater length. As a result, the ratio of the winding radius R of the magnetic tape wound on the reel to the radius r of the reel core (R/r) (hereinafter referred to as "winding radius ratio") tends to rise.

The reel core radius and maximum winding radius of DVC and DVCPRO systems are set forth in Table 1 below.

TABLE 1

|  | Reel core radius (r) | Maximum winding radius (R) | Winding radius ratio (R/r) |
|---|---|---|---|
| DV minicassette | 5.9 mm | 14 mm | 2.4 |
| Middle cassette | 7.5 mm | 21 mm | 2.8 |
| Large cassette 25 NBPS (126 minutes) | 9.5 mm | 32 mm | 3.2 |
| Large cassette 25 MBPS (184 minutes) | 7.5 mm | 32 mm | 4.2 |

DVCPRO large cassette 25 MBPS (184 minutes) reel has the largest winding radius ratio in reels which have been put to practical use to date.

Tape cassettes having a large winding radius ratio are subject to a great load on the wound tape, particularly at the portion close to the core, while put in vibration during transportation or the like. Thus, the magnetic tape can be subjected to stepping from the winding surface of the magnetic tape or undergo winding looseness.

The conventional technique for solving these problems comprises winding the magnetic tape on the reel with a tension to harden the winding of the tape on the reel, inhibiting the occurrence of the aforementioned defectives during transportation. However, when the tape reel having a tape wound on a reel with a high tension is stored at a high temperature and humidity over an extended period of time, the shape of the reel core is transferred to the tape, possibly causing dropout during recording/reproduction.

Further, the recent trend is for more magnetic tape to have a smaller thickness for prolonged performance time. The tape having a reduced thickness has a reduced mechanical strength and thus is more weak to high tension.

As mentioned above, the prolongation of performance time of magnetic tape and the reduction of size of magnetic tape cause a problem that the winding hardness of tape and the transportability and recording/reproduction performance of tape cannot be fairly balanced.

SUMMARY OF THE INVENTION

It is therefore an object of the present invention to provide a tape cassette with tape reel which is not subject to partial stepping of magnetic tape from the winding wall of magnetic tape and winding looseness of magnetic tape during transportation in the form of reel having a great winding ratio.

The foregoing and other objects of the present invention will become apparent from the following detailed description and examples.

The foregoing object of the present invention is accomplished with a tape reel comprising a tape reel portion and a magnetic tape wound on the reel core of the tape reel portion, wherein the ratio of the winding radius R of the magnetic tape to the radius r of the reel core (R/r) is not smaller than 3.5 and the winding hardness of the magnetic tape is adjusted to a range of from 1.9 to 11.5 N; and a tape cassette comprising such a tape reel.

In a preferred embodiment of implementation of the present invention, the coefficient of friction between the magnetic layer surface and the back surface of the magnetic tape is from 0.30 to 0.85 and the mechanical strength of the magnetic tape is from 0.8 to 3.4 N$\mu$m.

BRIEF DESCRIPTION OF THE DRAWING

By way of example and to make the description more clear, reference is made to the accompanying drawing in which.

DETAILED DESCRIPTION OF THE INVENTION

Figure 1:
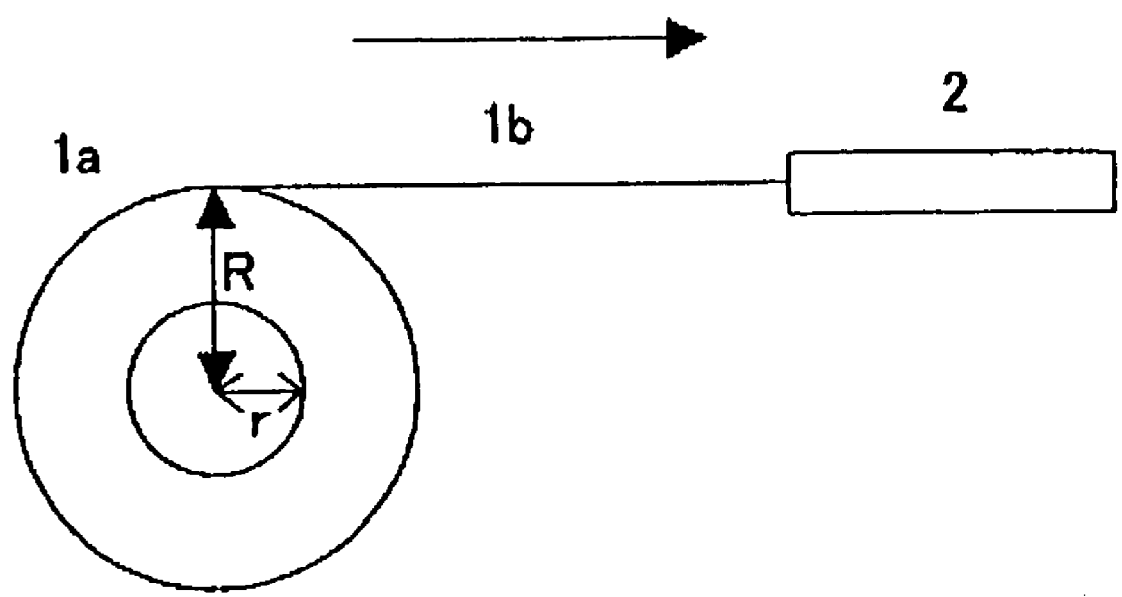
FIG. 1 is a diagram illustrating a method for measuring the tape winding hardness of the present invention, wherein the reference numeral 1a indicates a tape reel, the reference numeral 1b indicates a tape, and the reference numeral 2 indicates a push-pull gauge.

The tape reel and tape cassette of the present invention has a magnetic tape wound thereon at a winding radius ratio R/r of not smaller than 3.5. R is the winding radius of the magnetic tape (hereinafter occasionally referred simply to as "tape") wound on the reel core. R is the radius of the outermost one of the circles formed by the tape on the longitudinal section taken along the line perpendicular to the axis of the tape reel. The factor r is the radius of the reel core, i.e., maximum radius of circle at which the tape begins to wind.

In the present invention, the winding hardness (i.e., the winding fastening degree) of the tape is adjusted to a range of from 1.9 to 11.5 N, preferably from 1.9 to 7.4 N while the winding radius ratio of the tape falls within the above define range. The winding hardness of tape is measured by the method described later (see FIG. 1).

A tape reel 1a on which a tape 1b has been wound is horizontally fixed so that the reel cannot be rotated. The end of the tape 1b is then attached to a push-pull gauge 2. The maximum tensile force developed when the tape is pulled in the tangent direction of the tape reel by half the winding periphery ($\pi \times R$) is then measured as a winding hardness.

The measurement is effected at a temperature of 23° C. and 70% RH shortly after the winding of the magnetic tape on the reel.

When the winding hardness of the tape reel falls within the above defined range, the defectives such as stepping of magnetic tape from the winding wall of magnetic tape and winding looseness of magnetic tape during transportation of tape cassette can be effectively prevented.

The present invention contemplates the definition of the dynamic physical properties of tape and the winding radius ratio during transportation of tape reel. The tape reel and tape cassette to be used herein may be in any form. For example, the magnetic tape may be a vapor deposition type magnetic recording medium. Further, the present invention is not limited to two-reel type cartridge but can be applied to one-reel type tape cartridge. In the former type, it is preferred that the tape be not wound or, if any, slightly wound on one of the two reels.

In the present invention, there occurred neither stepping nor winding looseness of tape also in the following transportation resistance test.

A tape cassette having a tape reel incorporated therein is packaged in a tape cassette box. The tape cassette box is transported on a refrigerator truck over 1,000 km (at about 5° C.), and then transported back on an ordinary truck over 1,000 km. The winding conditions of the tape cassette are observed before and after transportation. The properties to be observed in the transportation resistance test are stepping of tape from the winding wall of tape and winding looseness of the wound portion of tape. The results observed after transportation are compared with photos of conditions before transportation to judge to see if these defectives have occurred.

The method for controlling the winding hardness is not limited. Preferably, a method involving the adjustment of coefficient of friction between the magnetic layer surface and the back surface of the tape ($\mu_{mb}$) and the mechanical strength of the tape is exemplified. The term "back surface" as used herein means the surface of the tape opposite the magnetic layer surface thereof.

When a tape having a low strength is wound on the reel at a high tension, the tape is wound stretched. The tape reel on which the tape has thus been wound at a high tension is subject to deformation of tape on the underlying tape or transfer of the shape of the reel core to tape, possibly causing dropout and other defects during recording and reproduction. Therefore, the tension during winding is restricted. Even when the winding tension is low, by adjusting the coefficient of friction between the magnetic layer surface and the back surface of the tape ($\mu_{mb}$) preferably to a range of 0.30 to 0.85, more preferably from 0.3 to 0.5, the winding hardness can be controlled to the above defined range, making it possible to prevent the occurrence of stepping of tape from the winding wall of tape and-winding looseness of tape during transportation test.

Examples of the method for controlling the friction coefficient ($\mu_{mb}$) will be given below.

a. Provision of Back Layer on Back Surface

The friction coefficient $\mu_{mb}$ is determined by the conditions of protrusions on the magnetic layer surface and the back surface. By applying a back layer to the surface of the tape opposite the magnetic layer surface thereof, the surface conditions and protrusion conditions of the back surface of the tape can be controlled.

b. Incorporation of Solid Lubricant in Back Layer

By predetermining the specific gravity, particle size, specific surface area and content of the solid lubricant to be incorporated to a specific range, the number and height of protrusions formed by the solid lubricant on the magnetic layer surface of the tape can be controlled.

1) A solid lubricant having a low apparent specific gravity is used to raise the number of protrusions.
2) A solid lubricant having a small particle size is used to lower the height of protrusions.
3) A solid lubricant having a small specific surface area is used to raise the dispersibility of the solid lubricant in the back layer coating solution, preventing the occurrence of secondary particles and thus making it possible to suppress the height of protrusions while raising the number of protrusions.
4) The content of the solid lubricant to be incorporated is raised to increase the number of protrusions.

By employing a process which comprises pasting a solid lubricant to obtain a monodisperse solid lubricant, adding the monodisperse solid lubricant to a back layer coating solution so that the height of the solid lubricant protruding from the surface of the back layer is uniform, and then processing the coating solution in combination with any of the aforementioned methods 1) to 4), the number of only protrusions having a predetermined height can be increased. By using the same material both as the binder to be incorporated in the solid lubricant paste and the binder to be incorporated in the back layer coating solution in which the solid lubricant is incorporated or increasing the compatibility of the two binders with each other, the movement of the solid lubricant particles during the coating and drying of the magnetic layer can be inhibited to suppress the height of protrusions. By adjusting the amount and kind of binder in the solid lubricant paste and the magnetic solution, the height and number of protrusions can be adjusted.

Examples of the aforementioned solid lubricant include microspherical powder of inorganic material such as carbon black, surface treatment product thereof, graphite, molybdenum disulfide, boron nitride, graphite fluoride, calcium carbonate, barium sulfate, silicon oxide, titanium oxide, zinc oxide, tin oxide and tungsten disulfide, and finely divided powder of resin such as acrylstyrene-based resin, benzoguanamine-based resin, melamine-based resin, olefin-based resin,. polyester-based resin, polyamide-based resin, polyimide-based resin and polyethylene fluoride-based resin.

In the present invention, $\mu_{mb}$ can be determined as follows.

A tape is wound by one turn on a SUS420J with a diameter of 10 mm in such a manner that the magnetic surface thereof is outside, and then fixed. Another tape is then allowed to slide over the underlying tape at an angle of 180°, a load of 10 g and a rate of 18 mm per second with its magnetic surface outside. The friction coefficient A is then determined according to Euler's equation:

$$\mu_{mb}=(1/\pi)ln(T2/10)$$

wherein T2: Sliding resistance (g)

In the present invention, the mechanical strength (S) of the tape is preferably from 0.8 to 3.4 N$\mu$m. The mechanical strength (S) is calculated by the following equation:

$$S=ET^3$$

wherein E is Young's modulus of tape; and T is the thickness of tape.

Examples of the method for controlling the mechanical strength of the tape will be given below.

(1) Adjustment of tape thickness: By changing the thickness of the support and the thickness of coat layers such as magnetic layer and back layer, the mechanical strength of the tape can be adjusted.

(2) Adjustment of Young's modulus of tape: By using selecting or preparing supports having different Young's moduli, Young's modulus of the tape can be controlled. Young's modulus of the. tape can be controlled also by changing Young's modulus of the magnetic layer and back layer. Young's modulus of the magnetic layer and back layer can be controlled by predetermining the kind, size and content of binder, powder, lubricant, etc.

The support to be used herein preferably has a Microvickers' hardness of not smaller than 75 kg/mm² (735 MPa). A known film such as biaxially-stretched polyethylene naphthalate, polyamide (aromatic, aliphatic), polyimide, polyamideimide and polybenzoxidazole can be used. In particular, a support comprising an aromatic polyamide or polyethylene naphthalate available as "Mictron", produced by Toray Industries, Inc., or "Aramica", produced by Asahi Kasei Corporation, is preferred.

EXAMPLE

The present invention will be further described in the following examples. In order to examine the relationship between the stepping of tape from the winding wall and winding looseness of tape during transportation of tape reel and the tape and winding radius ratio, tapes having different mechanical strengths S and different coefficients of friction between tapes ($\mu_{mb}$) were prepared.

These tapes were prepared by providing a non-magnetic layer containing a non-magnetic powder dispersed in a binder on one surface of a support, providing a magnetic layer containing a ferromagnetic powder dispersed in a binder on the non-magnetic layer to form two layers on the support, and then providing a back layer containing carbon black dispersed in a binder on the surface of the support opposite the magnetic layer side thereof. The term "parts" as used herein means "parts by weight".

| (1) Magnetic layer coating solution | |
|---|---:|
| Ferromagnetic metal powder (composition: Fe/Zn/Ni = 92/4/4) HC: 1,800 Oe (144 kA/m) Specific surface area by BET method ($s_{BET}$): 54 m²/g Crystalline size: 195 angstrom Surface treatment layer : Al₂O₃, SiO₂ Average long axis length: 0.18 μm Average acicular ratio: 10 Saturation magnetization σs: 130 Am²/kg | 100 parts |
| Vinyl chloride-based copolymer —SO₃Na content: 1 × 10⁻⁴ eq/g Polymerization degree: 300 | 12 parts |
| Polyester polyurethane resin Neopentyl glycol/caprolactone polyol/ MDI = 0.9/2.6/1 —SO₃Na group content: 1 × 10⁻⁴ eq/g | 3 parts |
| α-Alumina (average particle diameter: 0.3 μm) | 2 parts |
| Carbon black (average particle diameter: 0.10 μm) | 0.5 parts |
| Butyl stearate | 1 part |
| Stearic acid | 5 parts |
| Methyl ethyl ketone | 90 parts |
| Cyclohexanone | 30 parts |
| Toluene | 60 parts |
| (2) Non-magnetic layer coating solution | |
| Non-magnetic powder (α-Fe₂O₃) Average long axis length: 0.1 μm Specific surface area by BET method: 48 m²/g pH: 8 Fe₂O₃ content: 90% or more DBP oil absorption amount: 27 to 38 ml/100 g Surface treatment layer: Al₂O₃ | 80 parts |
| Carbon black Average particle diameter: 16 nm DBP oil absorption amount: 80 ml/100 g pH: 8.0 Specific surface area by BET method: 250 m²/g Volatile content: 1.5% | 10 parts |
| Vinyl chloride copolymer MR-110, produced by Nippon Zeon Co., Ltd. | 10 parts |
| Polyester polyurethane resin Molecular weight: 35,000 Neopentyl glycol/caprolactone polyol/ MDI = 0.9/2.6/1 —SO₃Na group content: 1 × 10⁻⁴ eq/g | 5 parts |
| Phenyl phosphonate | 10 parts |
| Butyl stearate | 1 part |
| Stearic acid | 1 parts |
| Methyl ethyl ketone | 100 parts |
| Cyclohexanone | 50 parts |
| Toluene | 50 parts |
| (3) Back layer coating solution | |
| Carbon black $S_{BET}$: 220 m²/g Average particle diameter: 17 nm DBP oil absorption amount: 75 ml/100 g Volatile content: 1.5% pH: 8.0 Bulk density: 15 lbs/ft³ (240 kg/m³) | 100 parts |
| Nitrocellulose RS1/2 | 100 parts |
| Polyester polyurethane Nippolan (produced by Nippon Polyurethane Co., Ltd.) | 30 parts |
| Dispersant Copper oleate | 10 parts |
| Copper phthalocyanine | 10 parts |
| Barium sulfate (precipitable) | 5 parts |
| Methyl ethyl ketone | 500 parts |
| Toluene | 500 parts |

The aforementioned ingredients were previously kneaded, and then kneaded by means of a roll mill. To 100 parts by weight of the aforementioned dispersion were then added the following ingredients:

| Carbon black $S_{BET}$: 200 m²/g Average particle diameter: 200 nm DBP oil absorption amount: 36 ml/100 g pH: 8.5 | 100 parts |
|---|---:|
| α-Al₂O₃ (average particle diameter: 0.2 μm) | 0.1 parts |

The mixture was subjected to dispersion by means of a sand grinder, and then filtered. To 100 parts by weight of the resulting dispersion were then added the following ingredients:

| Methyl ethyl ketone | 120 parts |
|---|---:|
| Polyisocyanate | 5 parts |

The aforementioned coating solutions (1) and (2) were each kneaded by means of an open kneader, and then subjected to dispersion by means of a sand mill. To the resulting dispersion were then added 3 parts of a polyisocyanate. To each of the magnetic layer coating solution and the non-magnetic layer coating solution were added 3 parts of a polyisocyanate. To each of these solutions were then added 40 parts of a mixture of methyl ethyl ketone and cyclohexanone. The mixture was then filtered through a filter having an average pore diameter of 1 μm to prepare a magnetic layer-forming coating solution and a non-magnetic layer-forming coating solution.

The magnetic layer coating solution and the non-magnetic layer coating solution were then applied to a support simultaneously to form a double layer. The two layers were then oriented by a cobalt magnet having a magnetic force of 300 mT and a solenoid having a magnetic force of 150 mT while in wet state and then dried. Subsequently, the back layer-forming coating solution obtained in the aforementioned step (3) was applied to the surface of the. support opposite the double-layer side thereof, and then dried. Thus, a magnetic recording laminate roll having a magnetic layer on one surface thereof and a back layer on the other was obtained. The magnetic recording laminate roll thus obtained was treated at a temperature of 90° C. by a 7-stage calender comprising only metallic rolls, and then slit into a strip having a width of 6.35 mm. Thus, a digital video recording tape was obtained. The tape thus prepared was wound on a reel by means of an assembling machine, and then incorporated in a cassette.

The reel with cassette used was DVCPRO large cassette 25 MBPS (184 minutes). The winding radius ratio was fixed to 4.2. Thus, the products of the present invention and comparative products were prepared.

Samples having different tape mechanical strengths prepared by changing Young's modulus and thickness of support were then measured for winding hardness and examined for transportation resistance. The results are set forth in Table 2. In Table 2, P in the results of transportation resistance test indicates those showing tape stepping and winding looseness. G in the results of transportation resistance test indicates those showing neither tape stepping nor winding looseness.

cient of friction between tapes was controlled. The measurement of winding hardness and the transportation resistance test were conducted with the change of the coefficient of friction between tapes. The results are set forth in Table 3.

TABLE 2

| Sample | Tape | | | | Winding hardness N | Transportation resistance test |
|---|---|---|---|---|---|---|
| | Thickness (μm) | Young's modulus N/mm$^2$ | Mechanical strength | Friction coefficient $\mu_{mb}$ | | |
| Example 1 | 6.5 | 7,350 | 2.0 | 0.30 | 8.0 | G |
| Example 2 | 6.5 | 8,722 | 2.4 | 0.30 | 4.1 | G |
| Example 3 | 6.5 | 12,250 | 3.4 | 0.30 | 2.1 | G |
| comparative Example 1 | 6.5 | 13,720 | 3.8 | 0.30 | 1.6 | P |
| Example 4 | 4 | 12,250 | 0.8 | 0.30 | 7.7 | G |
| Example 5 | 6 | 12,250 | 2.6 | 0.30 | 2.5 | G |
| Example 6 | 6.5 | 12,250 | 3.4 | 0.30 | 2.1 | G |
| Comparative Example 2 | 7 | 12,250 | 4.2 | 0.30 | 1.8 | P |

By switching between the presence and absence of back layer and changing the thickness of back layer, the coefficient

TABLE 3

| | Tape | | Winding | Transportation |

| Sample | Thickness (μm) | Young's modulus N/mm² | Mechanical strength | Friction coefficient $\mu_{mb}$ | hardness N | resistance test |
|---|---|---|---|---|---|---|
| Comparative Example 3 | 6.5 | 12,250 | 3.4 | 0.25 | 1.3 | P |
| Example 7 | 6.5 | 12,250 | 3.4 | 0.35 | 2.9 | G |
| Example 8 | 6.5 | 12,250 | 3.4 | 0.70 | 6.4 | G |
| Example 9 | 6.5 | 12,250 | 3.4 | 0.75 | 9.5 | G |
| Example 10 | 6.5 | 12,250 | 3.4 | 0.85 | 11.1 | G |

As can be seen in the results, when a tape reel having a winding hardness of from 1.9 to 11.5 N is used, preferably when the mechanical strength S of the tape is adjusted to a range of from 0.8 to 3.4 (Nμm) and the coefficient of friction between tapes ($\mu_{mb}$) is adjusted to a range of from 0.30 to 0.85, the occurrence of stepping of tape from the winding wall of tape and winding looseness of tape during transportation can be prevented.

By providing a back layer on the tape to lower the friction coefficient $\mu_{mb}$, an effect can be exerted of inhibiting the protrusion of tape from the winding wall during deck running. The coefficient of friction between tapes at which the occurrence of protrusion of tape from the winding surface of tape during deck running can be prevented falls within a range of from 0.30 to 0.85.

In accordance with the present invention, the ratio of the winding radius R of the magnetic tape wound on the reel core to the radius r of the reel core (R/r) is adjusted to not smaller than 3.5 and the winding hardness of the magnetic tape is adjusted to a range of from 1.9 to 11.5N. In this arrangement, a tape cassette with tape reel which is not subject to stepping of magnetic tape from the winding wall of tape and winding looseness of magnetic tape during transportation and thus exhibits a good recording/reproduction performance can be provided.

The entitle disclosure of each and every foreign patent application from which the benefit of foreign priority has been claimed in the present application is incorporated herein by reference, as if fully set forth herein.

While the present invention has been described in detail and with reference to specific embodiments thereof, it will be apparent to one skilled in the art that various changes and modifications can be made therein without departing from the spirit and scope thereof.

What is claimed is:

1. A tape reel comprising a tape reel portion and a magnetic tape wound on the reel core of the tape reel portion, wherein the ratio of the maximum winding radius R of the magnetic tape to the radius r of the reel core (R/r) is not smaller than 3.5 and the winding hardness of the magnetic tape is adjusted to a range of from 1.9 to 11.5 N.

2. The tape reel as in claim 1, wherein the mechanical strength of the magnetic tape is from 0.8 to 3.4 Nμm.

3. The tape reel as in claim 1, wherein the coefficient of friction between the magnetic layer surface and the back surface of the magnetic tape is from 0.30 to 0.85.

4. The tape reel as in claim 1, wherein the coefficient of friction between the magnetic layer surface and the back surface of the magnetic tape is from 0.3 to 0.5.

* * * * *